Feb. 23, 1971  O. WELLER  3,564,731
PLANNING AND ORGANIZATIONAL AID
Filed May 29, 1967  5 Sheets-Sheet 1
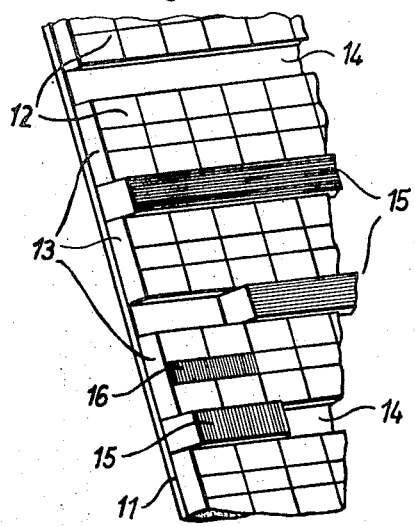
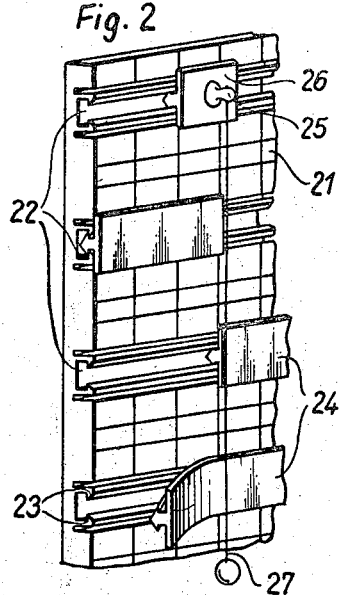
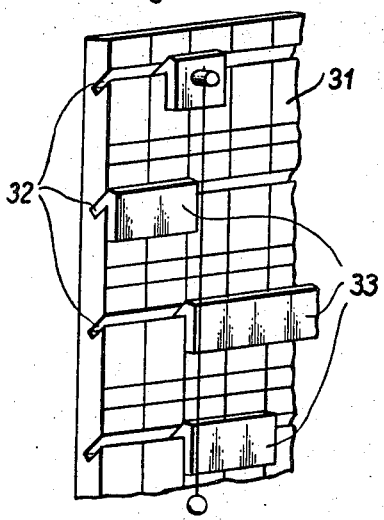
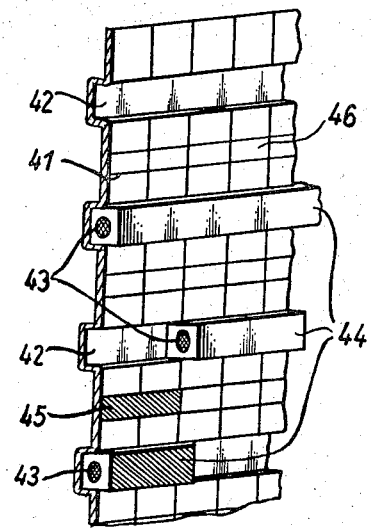
Inventor
Otto Weller
By Cushman, Darby & Cushman
Attorneys Feb. 23, 1971  O. WELLER  3,564,731
PLANNING AND ORGANIZATIONAL AID
Filed May 29, 1967  5 Sheets-Sheet 2

Inventor
Otto Weller
By Cushman, Darby & Cushman
Attorneys

Feb. 23, 1971　　　O. WELLER　　　3,564,731
PLANNING AND ORGANIZATIONAL AID
Filed May 29, 1967　　　5 Sheets-Sheet 3
Fig. 7
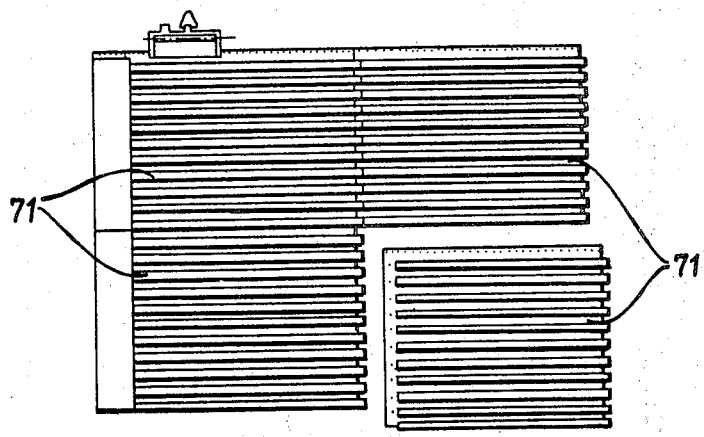
Fig. 8a
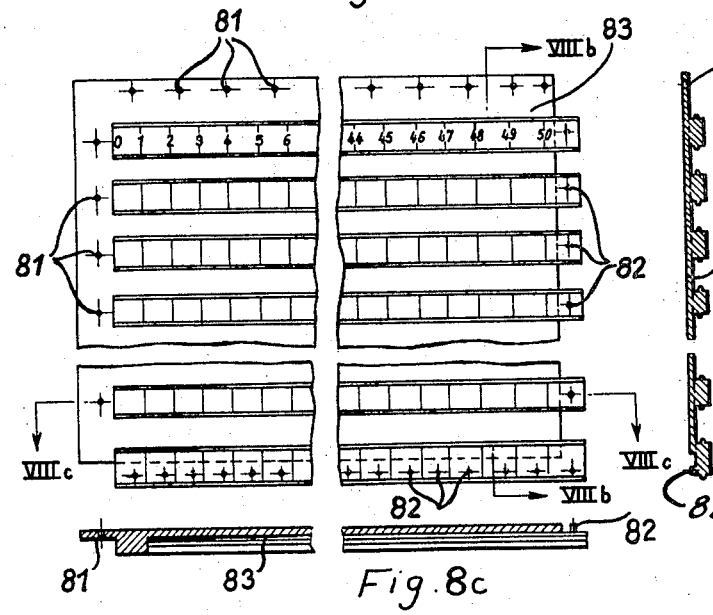

Feb. 23, 1971   O. WELLER   3,564,731
PLANNING AND ORGANIZATIONAL AID
Filed May 29, 1967   5 Sheets-Sheet 4
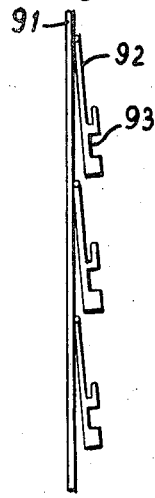
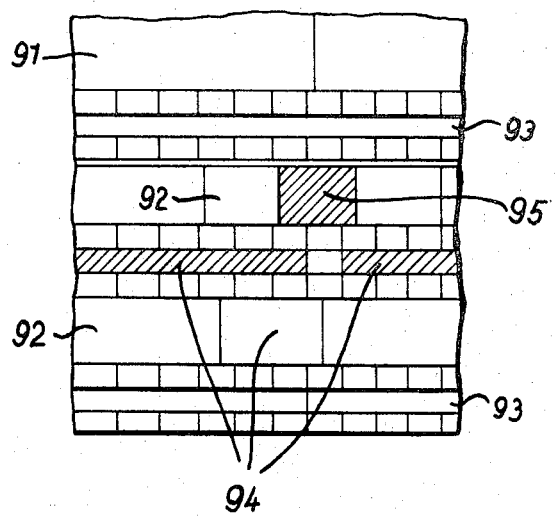
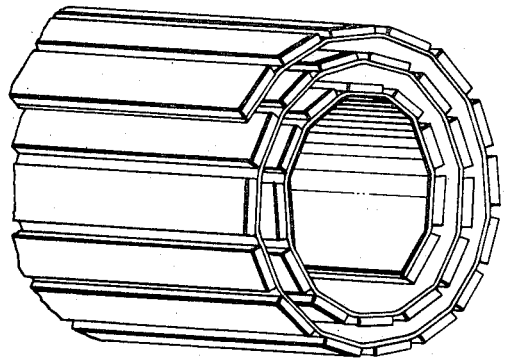
Inventor
Otto Weller
By Cushman, Darby & Cushman
Attorneys Feb. 23, 1971     O. WELLER     3,564,731

PLANNING AND ORGANIZATIONAL AID

Filed May 29, 1967     5 Sheets-Sheet 5

Inventor
Otto Weller
By Cushman, Darby & Cushman
Attorneys

United States Patent Office 3,564,731
Patented Feb. 23, 1971

3,564,731
PLANNING AND ORGANIZATIONAL AID
Otto Weller, 7 Bergstrasse, 6334 Asslar,
Kreis Wetzlar, Germany
Filed May 29, 1967, Ser. No. 641,805
Claims priority, application Germany, June 1, 1966,
W 41,710
Int. Cl. G09b *19/18*
U.S. Cl. 35—24                     1 Claim

---

ABSTRACT OF THE DISCLOSURE

The invention relates to an aid for planning and organizational schemes and comprises a tracked board having a gridwork and manually movable members in the tracks for giving a progress comparison with the gridwork.

---

This invention relates to a planning and organizational aid.

For the planning and organization of the most widely varying kinds, for example research and development projects, production planning in a very wide variety of branches of technology, sales planning and the publicity campaigns associated therewith, etc., various planning techniques have been developed in recent years, and of these, the so-called network planning technique has proved to be a particularly suitable method for advance planning.

With this technique, all foreseeable activities involved in the execution of the planned project, both of an intellectual and a material nature, are graphically illustrated in a "network plan," together with any existing time, capacity, cost, or other factors. In this network plan, however, "activities" are usually symbolized only by arrows in order to show relationships. However, for the mathematical evaluation of a network plan of this kind it has hitherto generally been necessary to use a data-processing computer in order to translate the network plan into the operational programme proper. By reason of the method of operation of the computer, this "translation" then appears in the form of more or less comprehensive tables, which in turn can be understood only by the highly expert. In spite of the great advantages of this technique in view of the rationalization demanded by constantly increasing costs, the expenditure involved can be tolerated only in the case of large and very large projects. However, for medium-sized and small projects, where the network planning technique per se can provide substantial advantages, no practicable method of evaluation has so far been possible.

The present invention, however, relates to an aid for a newly developed method of evaluating network plans of this kind, said aid being in itself, of course, a direction for human understanding. The aid for planning and organization outlined hereinafter is, however, an indispensible appliance for the execution of this method of evaluation, which for the first time permits a dynamic evaluation of the network plan, adaptable at any time to the assumptions of new data.

According to one broad aspect, the present invention relates to an aid for the evaluation of planning and organization, said aid including a board provided with a gridwork, a plurality of spaced, parallel tracks on said board, and a plurality of indicating elements interchangeable with one another slidably arranged in said tracks, said elements being of differing lengths and shapes and having different surface characteristics for giving a comparison with one another and with said gridwork.

The invention is illustrated, by way of example, in the accompanying drawings in which:

FIG. 1 is a perspective view of a portion of a board formed of flexible material with strips applied thereto;

FIG. 2 is a perspective view of a portion of a board formed of flexible material;

FIG. 3 is a perspective view of a portion of a board formed of rigid material, such as, for example wood;

FIG. 4 is a perspective view of a portion of a board formed of sheet metal;

FIG. 7 is a plan view of a plurality of boards connected together;

Figure 11:
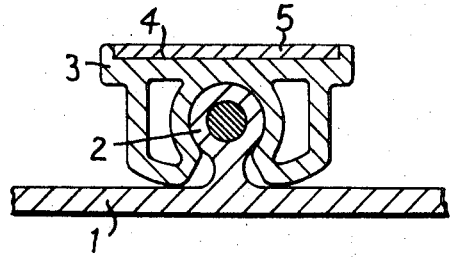
Figure 12:
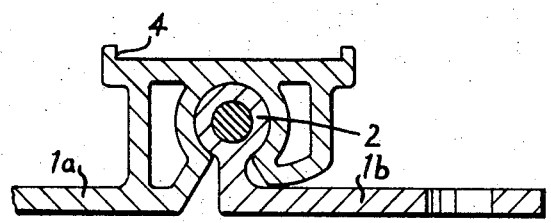
Figure 13:
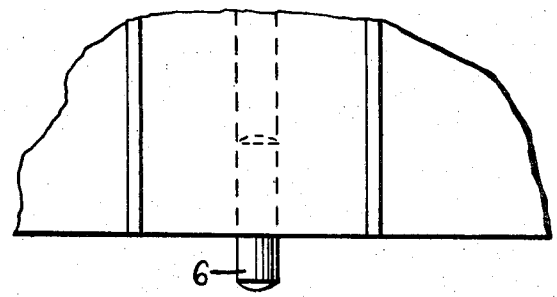

FIG. 8*a* is a plan view of a plurality of board coupling elements;

FIG. 8*b* is a section taken on the line VIII*b*—VIII*b* of FIG. 8*a*;

FIG. 8*c* is a section taken on the line VIII*c*—VIII*c* of FIG. 8*a*;

FIGS. 9*a* and 9*b* show a board including a plurality of working folders;

FIG. 10 is a perspective view of the type of board shown in FIG. 1 but in a rolled up condition; and FIGS. 11 to 13 show alternative forms of the invention.

Referring to the drawings, and in particular to FIG. 1, the board consists of a backing 11 formed of any suitable flexible material such as, for example, foil and to which is attached a plurality of strips 13 each of which is provided with a grid consisting of a plurality of equi-distant vertical and horizontal markings 12. The space between each adjacent pair of strips 13 serves as a guideway or track 14 adapted to receive an interchangeable and slidable indicating element 15. The markings 12 can be used for any desired purpose. For instance, the vertical markings can indicate a time scale and the horizontal markings can be used as guide lines for lining up adhesive identifying strips 16 which can be applied to the front face of the strips 13.

In FIG. 2, the board is formed of any suitable flexible plastic material by injection moulding or any other similar process. As will be seen from the drawing, the board is provided with a plurality of horizontal guideways or tracks 22 of dovetail cross section, said tracks having flexible marginal side edges 23 which are displaceable to permit the introduction of extruded interchangeable and slidable indicating elements 24. As will also be seen from FIG. 2, the uppermost indicating element 26 is of a different type and is provided with a stud 25 which is adapted to support a plumb-line 27.

In FIG. 3 the board is formed of wood and is provided with oblique grooves 32 each of which is adapted to receive an interchangeable and slidable indicating element 33.

The board shown in FIG. 4 is formed from any suitable sheet metal so that it is provided with integral guideways or tracks 42 which are adapted to receive interchangeable and slidable indicating elements 44 having magnetic cores 43. In this case, the identifying strips 45 are of magnetic foil.

Figure 5:
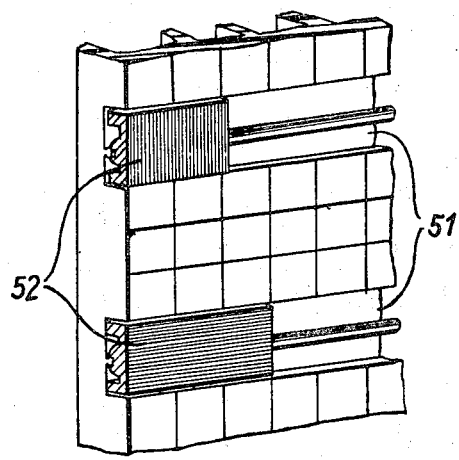
FIGS. 5 and 6 are perspective views of two further embodiments of boards formed of flexible material.
Figure 6:
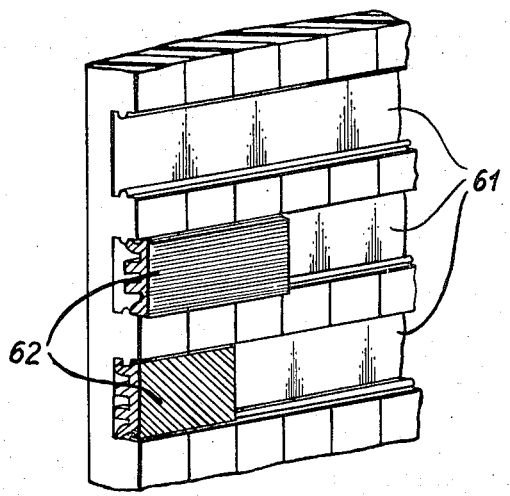

FIGS. 5 and 6 show alternative forms of board constructed from any suitable moulded or extruded plastic and which has, respectively, guideways or tracks 51, 61 and interchangeable and slidable indicating elements 52, 62 of different configurations and cross sections.

If desired, and as will be seen from FIG. 7, a plurality of boards 71 may be connected together to form a single composite board. In this case, and as will be seen from FIG. 8*a*, a pair of adjacent and adjoining marginal edges of each board 83 is provided with a plurality of equi-spaced holes 81 while the remaining pair of adjacent and adjoining marginal edges is provided with a plurality of equi-spaced and projecting pins 82. Hence, and by means of the holes 81 and pins 82, the boards 83 can be connected together. FIGS. 8*b* and 8*c* are sections of the board shown in FIG. 8a taken respectively on the lines VIIIb—VIIIb and VIIIc—VIIIc.

FIGS. 9a and 9b show a board constituted by a backing of flexible material 91 and a plurality of element holders 92 suspended therefrom. A track 93, for slidable co-operation by indicating elements 94, 95 is provided adjacent the lower marginal edge of each said holder 92. The backing, holders and elements constitute, in their totality, an experimental board.

In the arrangement shown in FIG. 11, the backing 1 is formed of either plastic or metal and is provided with rounded frontal extensions 2 and onto which members 3, provided with tracks 4, can be snapped. The tracks 4 are adapted to receive elements 5.

In the arrangement shown in FIG. 12, the board is constituted by elements 1a and 1b each of the latter having a rounded extension 2 onto which element 1a can be snapped, the latter having a track 4.

As is shown in FIG. 13, the various elements can be clipped together in a flexible manner by a pin 6.

As will be seen from the drawings, all forms of the invention have those portions of the board, located between the guideways or tracks, provided with a grid.

Moreover, in all forms of the invention, the slidable identifying strips may be of different lengths, different colours or may have different and distinguishing surface characteristics.

If desired, at least one slidable element is provided with a plurality of sequential numbers. Such an element is the uppermost element such as that shown in FIG. 8a.

From the above arrangements, it will be seen that the indicating elements, in conjunction with the gridwork, will enable any planning and organizational comparison to be made and to fit various schemes.

I claim:
1. An aid for the evaluation of planning and organization, said aid including a plurality of boards, each provided with a gridwork, means for detachably connecting said boards together, each of said boards being constituted by a backing of flexible material, a plurality of element holders suspended from said board; each of said holders having a track adjacent its lower marginal edge, each of said tracks spaced parallel to one another, a plurality of indicating elements slidably mountable in said tracks and individually interchangeable with one another, said elements being of differing lengths and shapes and having different surface characteristics for giving a comparison with one another and with said gridwork, the portions of the boards located between the tracks being provided with said gridwork, at least one of said elements being provided with a plurality of sequential numbers and said elements being formed from flexible material.

References Cited

UNITED STATES PATENTS

| 2,745,201 | 5/1956 | Giuseppe et al. | 40—140 |
| 3,162,174 | 12/1964 | Whyte | 35—24(.2)X |
| 2,544,445 | 3/1951 | Corzilius | 35—24(.2) |
| 3,224,126 | 12/1965 | Bogusz | 35—7(.3)X |

FOREIGN PATENTS

| 254,158 | 3/1963 | Australia | 35—7 |
| 646,016 | 10/1964 | Belgium | 35—24(.2) |
| 1,108,923 | 9/1955 | France | 35—24(.2) |
| 88,626 | 1/1957 | Norway | 35—24(.4) |
| 356,947 | 10/1961 | Switzerland | 35—24 |

WILLIAM H. GRIEB, Primary Examiner